(12) United States Patent
Kim

(10) Patent No.: US 12,313,144 B2
(45) Date of Patent: May 27, 2025

(54) DAMPING FORCE VARIABLE VALVE ASSEMBLY

(71) Applicant: HL MANDO CORPORATION, Pyeongtaek (KR)

(72) Inventor: Eunjoong Kim, Hwaseong (KR)

(73) Assignee: HL MANDO CORPORATION, Pyeongtaek (KR)

( * ) Notice: Subject to any disclaimer, the term of this patent is extended or adjusted under 35 U.S.C. 154(b) by 437 days.

(21) Appl. No.: 17/843,971

(22) Filed: Jun. 18, 2022

(65) Prior Publication Data

US 2022/0412429 A1   Dec. 29, 2022

(30) Foreign Application Priority Data

Jun. 24, 2021   (KR) .................. 10-2021-0082592

(51) Int. Cl.
| F16F 9/512 | (2006.01) |
|---|---|
| F16F 9/19 | (2006.01) |
| F16F 9/54 | (2006.01) |

(52) U.S. Cl.
CPC .............. *F16F 9/5126* (2013.01); *F16F 9/19* (2013.01); *F16F 9/54* (2013.01); *F16F 2230/0005* (2013.01); *F16F 2230/18* (2013.01)

(58) Field of Classification Search
CPC .... F16F 9/1526; F16F 9/19; F16F 9/54; F16F 2230/0005; F16F 2230/18
See application file for complete search history.

(56) References Cited

U.S. PATENT DOCUMENTS

| 5,409,088 | A | * | 4/1995 | Sonsterod | ............. | F16F 9/3214 |
|---|---|---|---|---|---|---|
| | | | | | | 188/282.3 |
| 5,501,307 | A | * | 3/1996 | Lars | ............. | F16F 9/465 |
| | | | | | | 188/266.8 |
| 5,850,896 | A | * | 12/1998 | Tanaka | ............. | F16F 9/465 |
| | | | | | | 188/266.2 |
| 6,003,644 | A | * | 12/1999 | Tanaka | ............. | F16F 9/465 |
| | | | | | | 188/266.5 |
| 7,878,311 | B2 | * | 2/2011 | Van Weelden | ............. | F16F 9/465 |
| | | | | | | 188/282.7 |
| 2009/0020382 | A1 | * | 1/2009 | Van Weelden | ............. | F16F 9/465 |
| | | | | | | 188/282.3 |
| 2019/0032743 | A1 | * | 1/2019 | Sakai | ............. | F16F 9/34 |
| 2020/0309228 | A1 | * | 10/2020 | Im | ............. | F16F 9/464 |
| 2024/0240687 | A1 | * | 7/2024 | Lee | ............. | F16K 15/1823 |

FOREIGN PATENT DOCUMENTS

| JP | H09133171 A | 5/1997 |
|---|---|---|
| JP | 4491270 B2 | 6/2010 |
| KR | 101937469 B1 | 4/2019 |

* cited by examiner

*Primary Examiner* — Thomas W Irvin
(74) *Attorney, Agent, or Firm* — Harvest IP Law, LLP

(57) ABSTRACT

Disclosed is a damping force variable valve assembly capable of improving linearity of a damping force through pressure control by being provided as a poppet type built in a shock absorber and by improving the responsiveness so that a check valve responds and opens quickly by a minimum load.

18 Claims, 9 Drawing Sheets

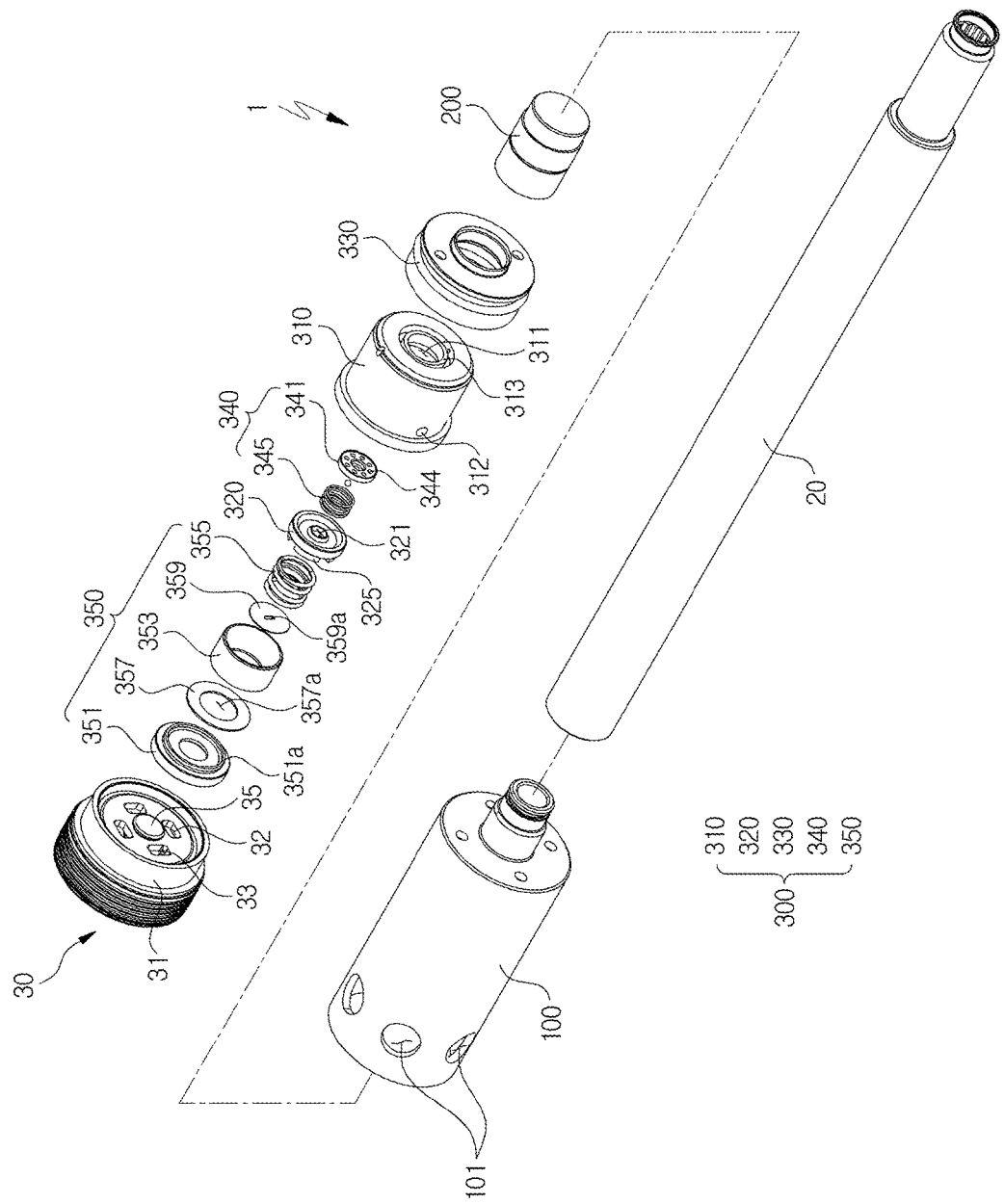
[FIG. 1]

[FIG. 2]
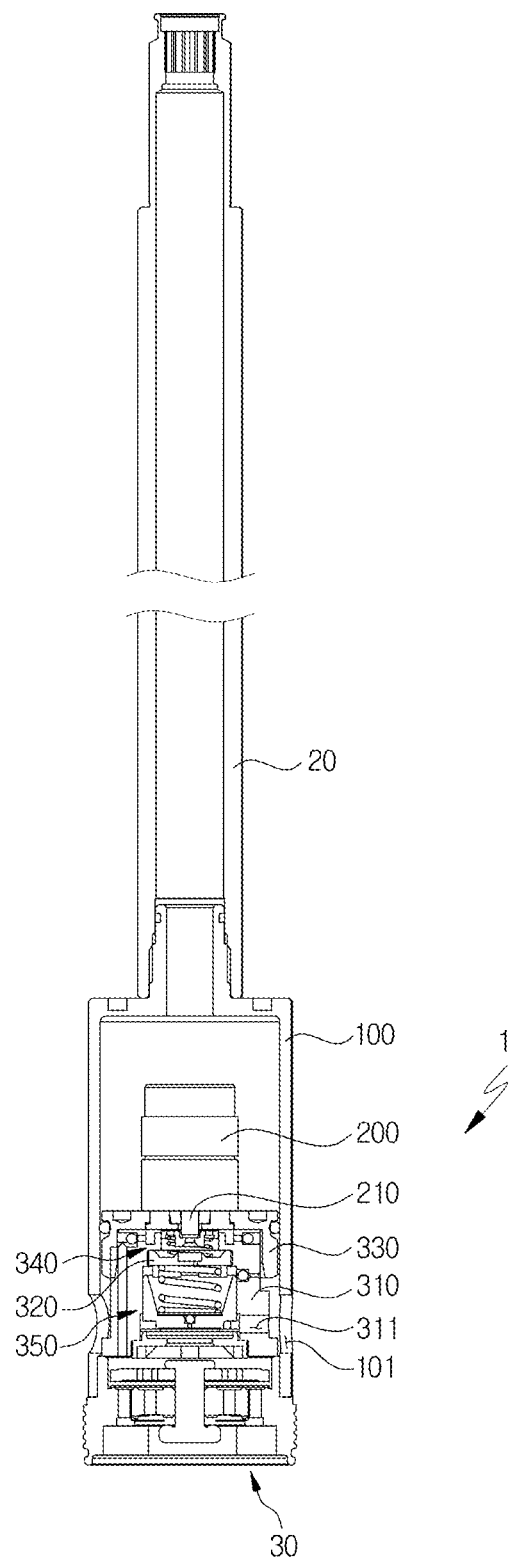

[FIG. 3]
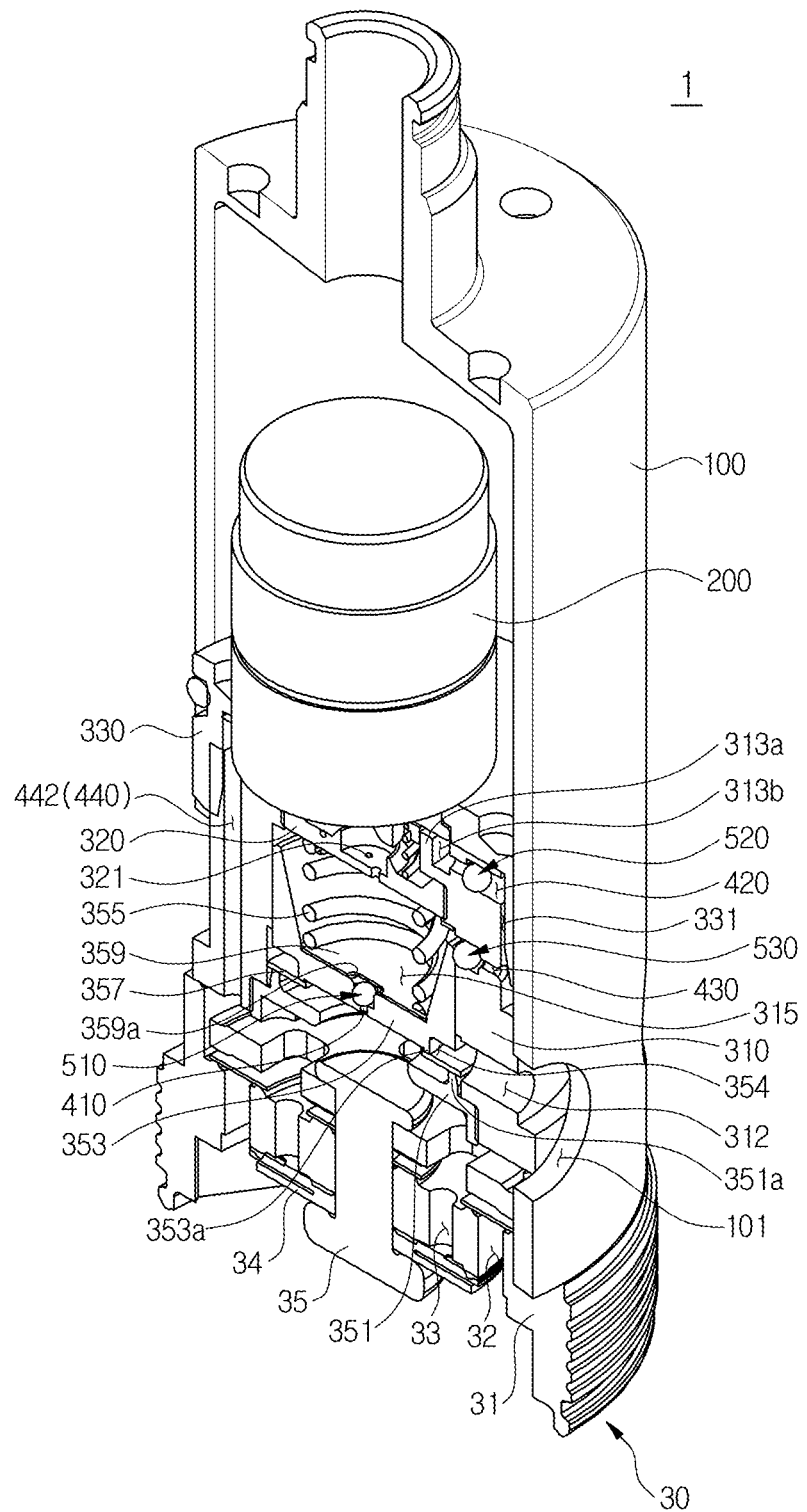

[FIG. 4]
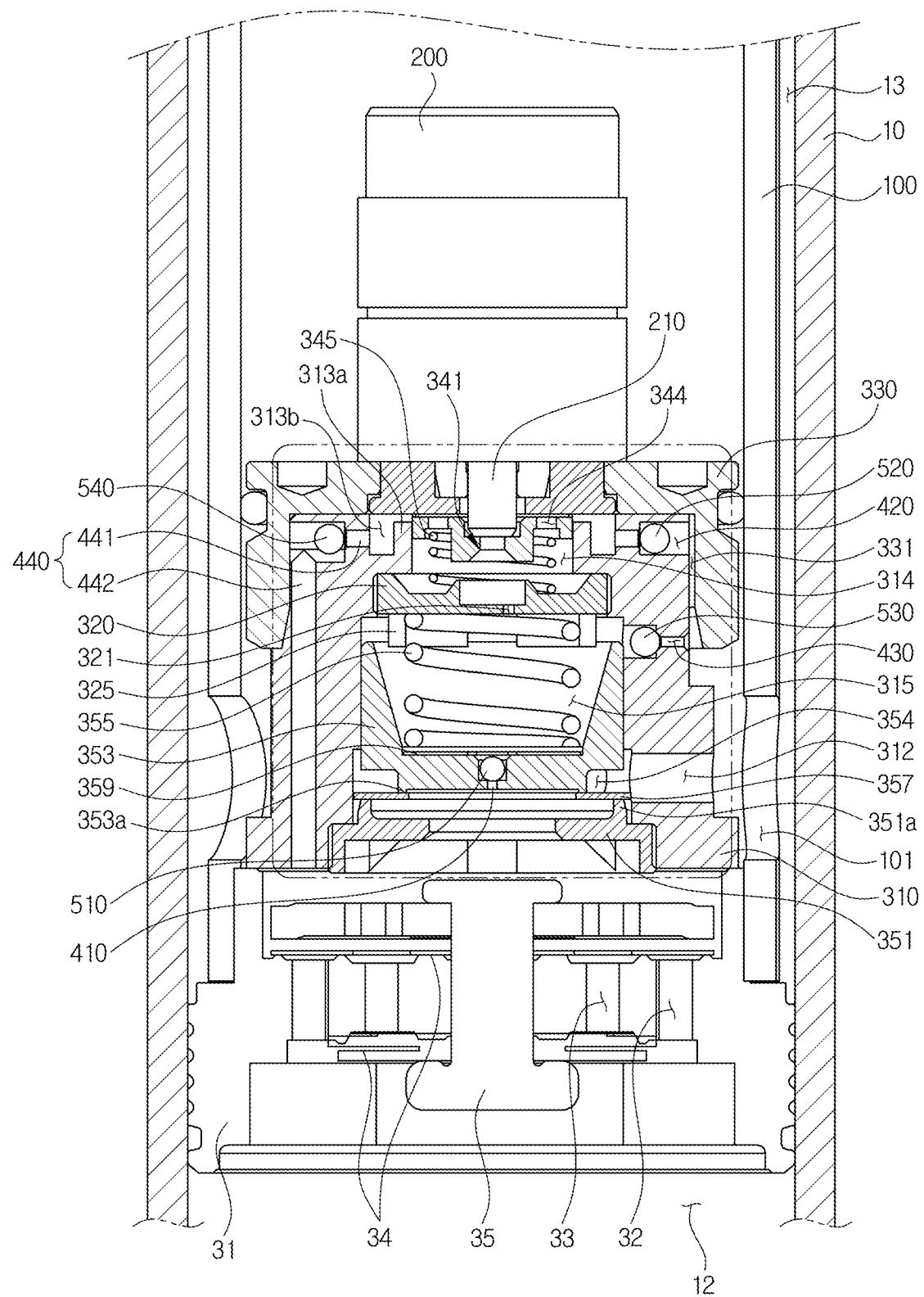

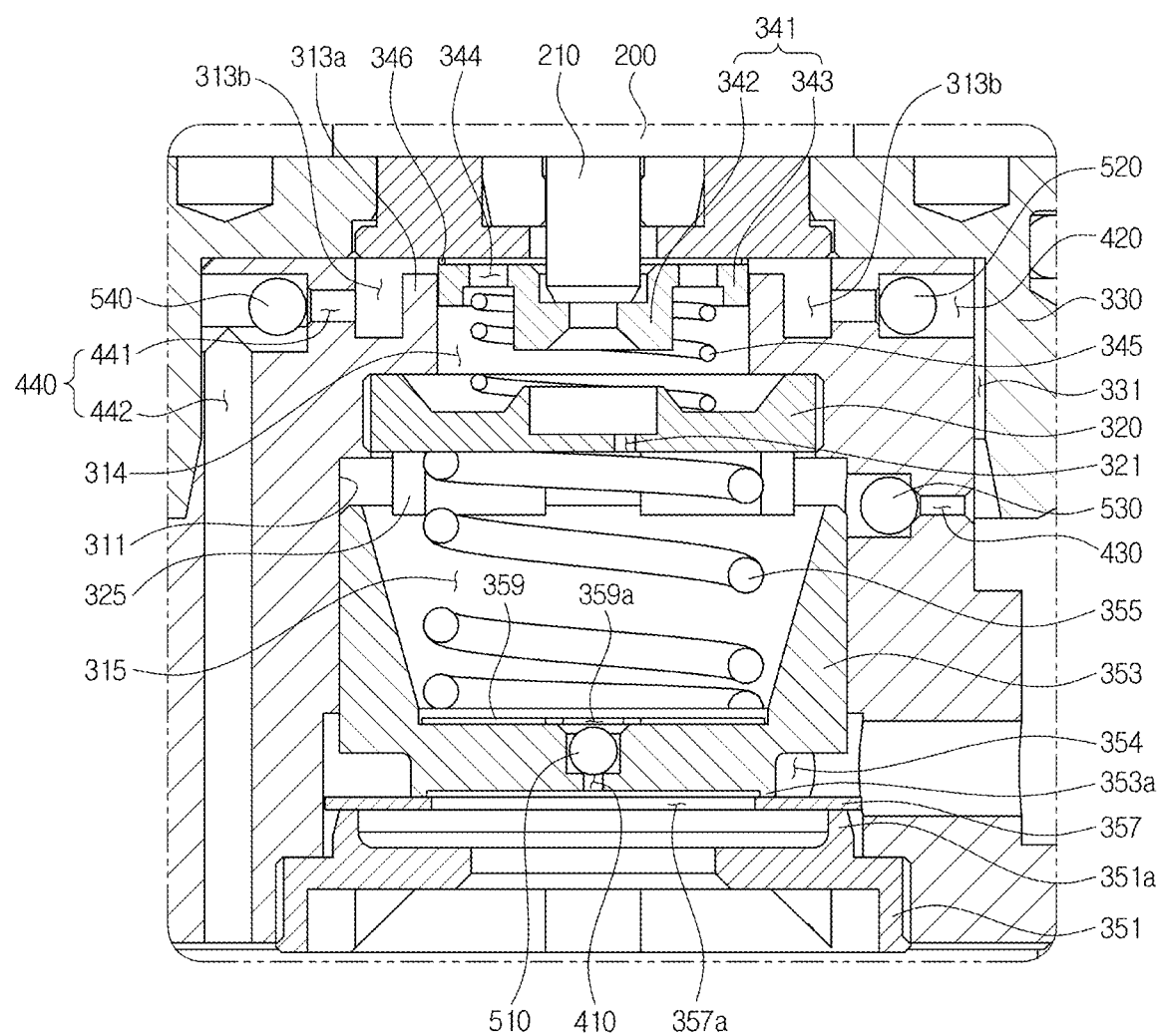
[FIG. 5]

[FIG. 6]
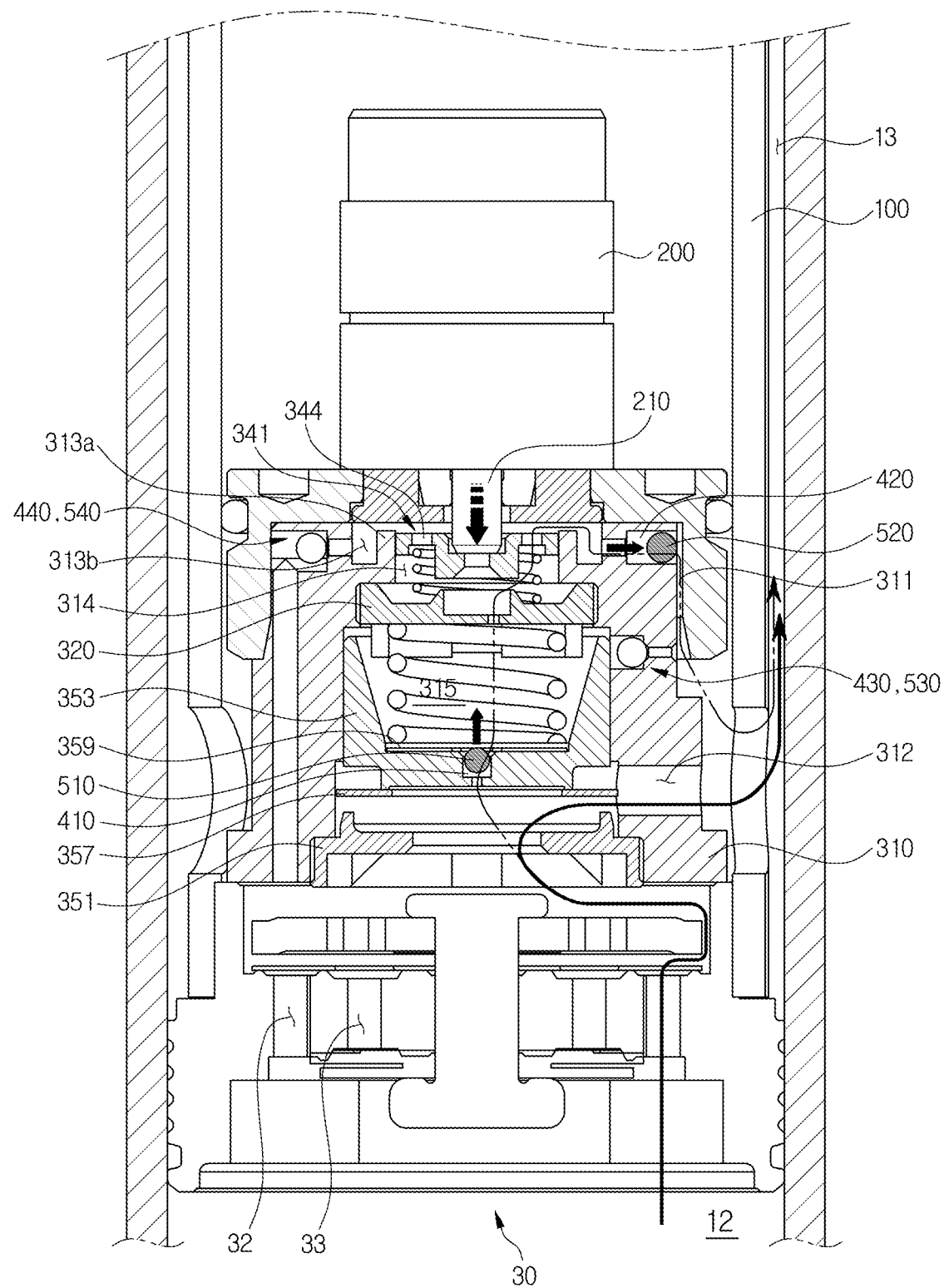

[FIG. 7]
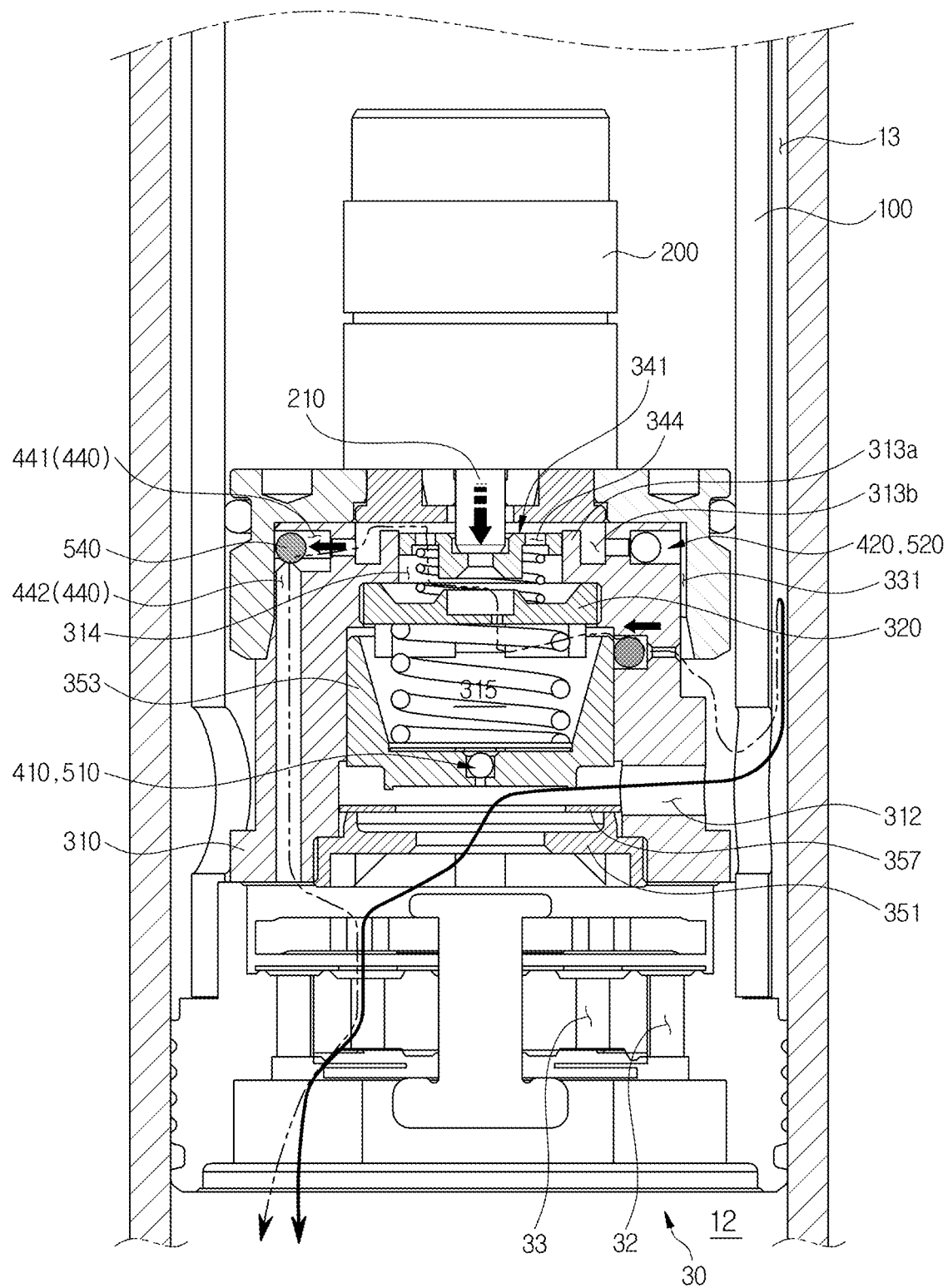

[FIG. 8]
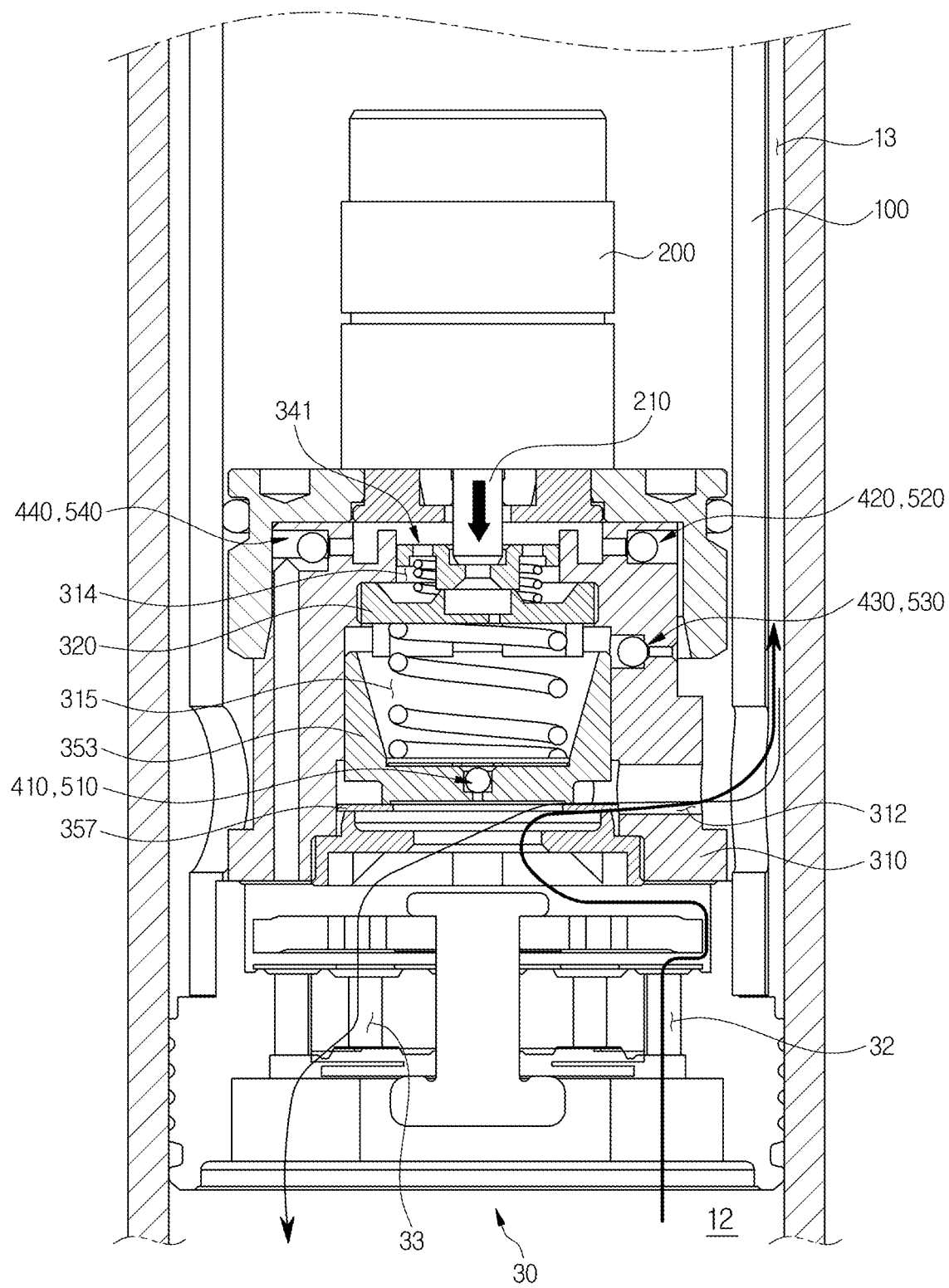

[FIG. 9]
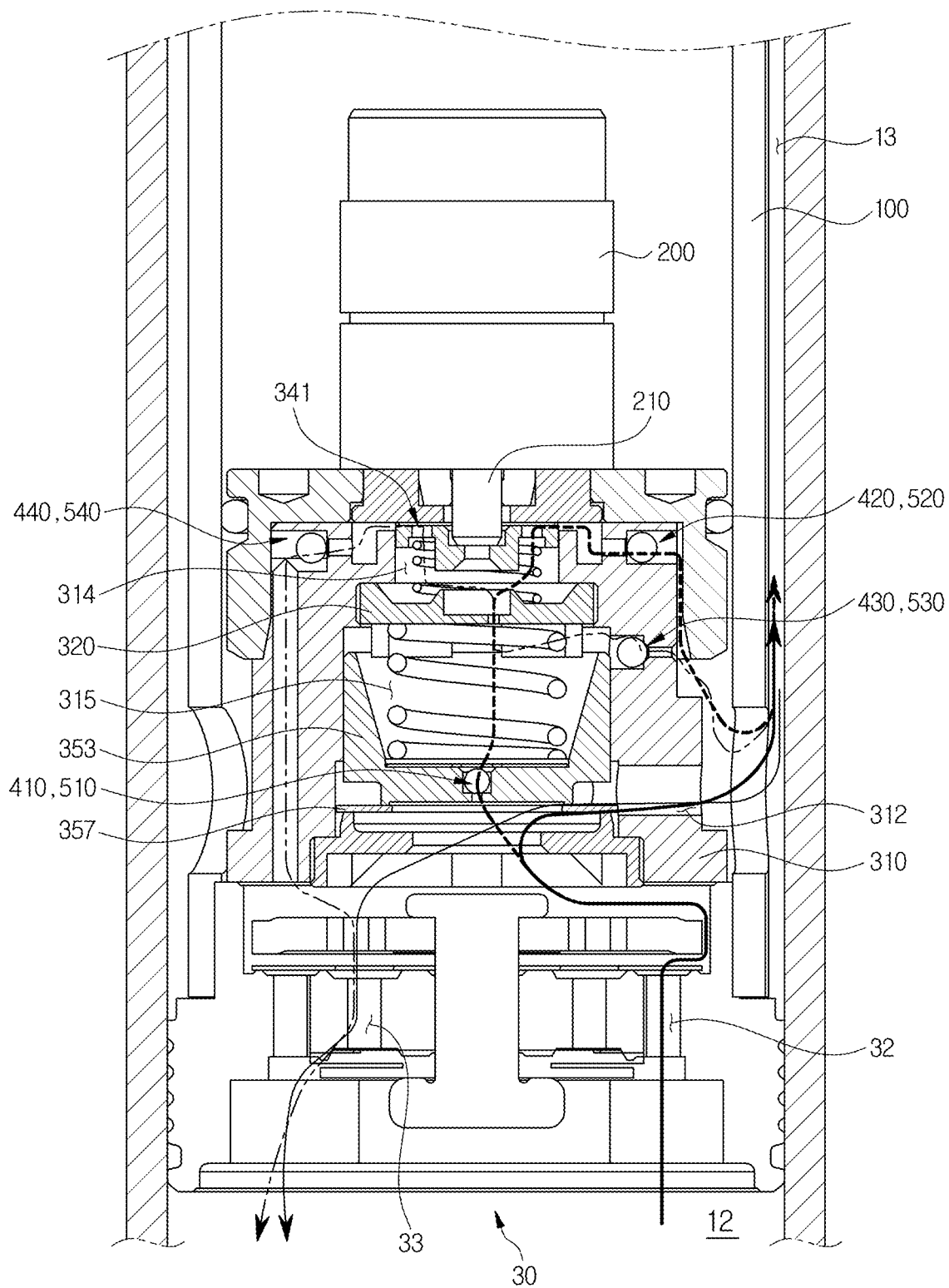

DAMPING FORCE VARIABLE VALVE ASSEMBLY

CROSS-REFERENCE TO RELATED APPLICATION(S)

This application is based on and claims priority under 35 U.S.C. § 119 to Korean Patent Application No. 10-2021-0082592, filed on Jun. 24, 2021, in the Korean Intellectual Property Office, the disclosure of which is incorporated by reference herein in its entirety.

BACKGROUND

1. Field

The disclosure relates to a damping force variable valve assembly, and more particularly, to a damping force variable valve assembly provided inside a cylinder of a shock absorber to improve a damping force by controlling a bidirectional flow during compression and rebound strokes.

2. Description of the Related Art

In general, a shock absorber is installed in a means of transportation such as a vehicle and a motorcycle to absorb and buffer a vibration or shock applied from a road surface during driving to improve ride comfort.

The shock absorber is composed of a cylinder filled with a fluid, a piston rod installed inside the cylinder to enable a compression stroke or rebound stroke, and a piston valve located inside the cylinder in a state of being coupled to the piston rod to generate a damping force.

Such a shock absorber has characteristics of improving ride comfort by absorbing vibration caused by unevenness of a road surface when the damping force is set low, and conversely, improving steering stability by suppressing a change in posture of a vehicle body when the damping force is set high.

Recently, a damping force variable shock absorber capable of setting different damping force characteristics depending on the purpose of use of a vehicle has been applied to the vehicle.

The damping force variable shock absorber includes an outer tube, an inner tube installed inside the outer tube and in which a piston rod is installed to be movable in a longitudinal direction, and a piston valve coupled to one end of the piston rod to divide the inner tube into a compression chamber and a rebound chamber. The damping force variable shock absorber also includes a damping force variable valve assembly for adjusting a damping force, and the damping force variable valve assembly may be classified into a spool type and a poppet type. In general, the spool type is used as an internal-mounted type to be installed inside a cylinder, and the poppet type is used as an external-mounted type to be installed outside a cylinder.

This spool-type damping force variable valve assembly includes a solenoid that is operated by an electromagnetic force, a movable spool that is operated by a solenoid, and a spool rod provided to reciprocate the movable spool and having a plurality of orifices to control the flow of a fluid depending on the operation of the movable spool. That is, the spool-type damping force variable valve assembly has a structure capable of varying the damping force by changing a size of the orifice to be introduced into a pilot chamber by moving a position of the movable spool.

However, the structure of the spool-type damping force variable valve assembly has a problem in that the size of the fixed orifice changes depending on a current, thereby rapidly increasing the damping force depending on a flow rate, requires precision machining to facilitate the movement of the movable spool, and has a problem in that a separate process is required for adjusting an initial position of the movable spool.

Accordingly, a poppet-type damping force variable valve assembly applied to the external-mounted type is applied to the internal-mounted type. In this case, unlike the external-mounted type having a unidirectional flow path, because in the internal-mounted type, a bidirectional flow path (compression and rebound flow path) needs to be controlled by a single valve, a check valve is essential.

However, because the check valve should open and close smoothly in response to switching in stroke, but a minimum load to open the check valve is large, the check valve may not respond quickly to the frequent switching in stroke, so that the damping performance of a shock absorber may be deteriorated.

SUMMARY

It is an aspect of the disclosure to provide a damping force variable valve assembly capable of improving linearity of a damping force through pressure control by being provided as a poppet type bunt in a shock absorber and by improving the responsiveness so that a check valve responds and opens quickly by a minimum bad.

It is an aspect of the disclosure to provide a damping force variable valve assembly capable of improving a structure thereof to reduce the cost and assembly process as well as improve a tuning freedom.

Additional aspects of the disclosure will be set forth in part in the description which follows and, in part, will be obvious from the description, or may be learned by practice of the disclosure.

In accordance with an aspect of the disclosure, a damping force variable valve assembly is installed in a shock absorber including a cylinder filled with a fluid, and a piston valve provided to divide the inside of the cylinder into a compression chamber and a rebound chamber and perform a compression stroke and a rebound stroke together with a piston rod, the damping force variable valve assembly including a housing having an upper end to which the piston rod is coupled and a lower end to which the piston valve is coupled to move together with the piston valve in the cylinder, a solenoid installed in the housing and having a spool operated by a magnetic force, and a pressure controller disposed between the solenoid and the piston valve within the housing, provided with a main flow path through which the fluid moves during the compression stroke or the rebound stroke, and provided to adjust a damping force depending on an operation of the solenoid, wherein the pressure controller includes first and second ball check valves provided to allow a flow of the fluid separately from the main flow path during the compression stroke, and third and fourth ball check valves provided to allow a flow of the fluid separately from the main flow path during the rebound stroke, and the first to fourth ball check valves are provided in a state in which a preload is zero when operated.

The pressure controller may include a valve housing having a hollow portion formed in a longitudinal direction and provided with the main flow path connecting the compression chamber and the rebound chamber through the piston valve, a valve seat provided to divide the hollow portion into a poppet chamber and a pilot chamber and provided with a connection flow path communicating the poppet chamber and the pilot chamber, a poppet valve unit provided in the poppet chamber to adjust an amount of the fluid passing through the connection flow path depending on the operation of the solenoid, and a main valve unit installed in the pilot chamber to be movable up and down so as to mutually move the fluid in the compression chamber and the rebound chamber.

The pressure controller may be provided with a first flow path connecting the piston valve and the pilot chamber, a second flow path connecting the poppet chamber and the rebound chamber, a third flow path connecting the rebound chamber and the pilot chamber, and a fourth flow path connecting the poppet chamber and the piston valve.

The first flow path may be provided in the main valve unit, and the second to fourth flow paths may be provided to penetrate a side surface of the valve housing to communicate with the hollow portion.

A first ball check valve may be provided in the first flow path, a second ball check valve may be provided in the second flow path, a third ball check valve may be provided in the third flow path, and a fourth ball check valve may be provided in the fourth flow path, the first and second ball check valves may be opened during the compression stroke and closed during the rebound stroke to open and close the first and second flow paths, and the third and fourth ball check valves may be opened during the rebound stroke and closed during the compression stroke to open and close the third and fourth flow paths.

The second and fourth ball check valves may be provided to be symmetrical to each other in the second and fourth flow paths.

The fourth flow path may include a horizontal flow path provided to penetrate a side surface of the valve housing so as to be connected to the poppet chamber, and a vertical flow path connected to the horizontal flow path so as to be connected to the piston valve.

The damping force variable valve assembly may further include a fastening member coupled to the valve housing to be configured as one assembly together with the solenoid on an upper portion of the valve housing so as to mount the valve housing in the housing.

The second flow path and the third flow path may be formed to be spaced apart from each other by a predetermined distance on the same side surface of the valve housing, and an auxiliary flow path connecting the second and third flow paths and the rebound chamber may be provided in the fastening member or the valve housing.

The damping force variable valve assembly may further include a support plate installed in the main valve unit to support the first ball check valve provided in the first flow path, wherein a long hole may be formed on the support plate to prevent a ball from being separated when the first ball check valve is opened and to allow the fluid to flow into the pilot chamber through the first flow path.

The main valve unit may include a main seat fixed to the valve housing and having a hollow center, a main valve installed in the pilot chamber to be movable up and down and provided with a first flow path formed vertically to communicate the piston valve and the pilot chamber, a main spring installed in the pilot chamber to elastically support the main valve toward the main seat, and a ring disk interposed between the main valve and the main seat and having a flow path hole formed in the center thereof to allow the fluid to pass therethrough.

The main valve may be provided to move up and down together with the ring disk during the compression stroke, and only the main valve may be provided to move up and down during the rebound stroke.

The ring disk may be disposed at a position corresponding to a position where the main flow path is formed.

The poppet valve unit may include a poppet valve having a poppet body part connected to the spool to move forward and backward depending on an operation of the spool and selectively come into contact with the valve seat, and a flange part formed to extend in a radial direction from the poppet body part to be in close contact with an inner circumferential surface of the hollow portion of the valve housing, and a poppet spring installed in the poppet chamber to elastically support the poppet valve upward.

The poppet valve may include at least one stopper protruding toward the solenoid.

At least one communication hole formed to vertically penetrate the flange part to communicate the poppet chamber with the second and fourth flow paths may be provided on the flange part.

When a low current is applied to the solenoid, the poppet valve may be operated to communicate the communication hole with the second flow path or the third flow path depending on the compression stroke or the rebound stroke and to maintain the poppet body part and the valve seat in a state of being spaced apart by a predetermined distance.

When a high current is applied to the solenoid, the poppet valve may be operated to maintain the poppet body part in a state of being in contact with the valve seat.

When the poppet valve unit closes the poppet chamber and the second and fourth flow paths, the first to fourth ball check valves may be maintained in a closed state so that the fluid moves only through the main flow path.

A stepped portion may be provided at an upper end of the valve housing to provide an auxiliary chamber that is closed or communicates with the poppet chamber depending on an operation of the poppet valve.

The stepped portion may be provided to be spaced apart from the solenoid facing the valve housing by a predetermined distance.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is an exploded perspective view of a damping force variable valve assembly, a piston rod, and a piston valve according to an embodiment of the disclosure;

FIG. 2 is a cross-sectional view in which the damping force variable valve assembly, the piston rod, and the piston valve, which are illustrated in FIG. 1 are assembled;

FIG. 3 is a partially cut-away perspective view of the damping force variable valve assembly according to an embodiment of the disclosure;

FIG. 4 is a cross-sectional view of the damping force variable valve assembly according to an embodiment of the disclosure;

FIG. 5 is an enlarged cross-sectional view of a pressure controller of the damping force variable valve assembly according to an embodiment of the disclosure:

FIG. 6 is a view illustrating an operation during a compression stroke of a shock absorber provided with the damping force variable valve assembly according to an embodiment of the disclosure;

FIG. 7 is a view illustrating an operation during a rebound stroke of the shock absorber provided with the damping force variable valve assembly according to an embodiment of the disclosure;

FIG. 8 is a view illustrating that a pressure is controlled through the damping force variable valve assembly according to an embodiment of the disclosure; and FIG. 9 is a view illustrating an operation of the shock absorber when a solenoid of the damping force variable valve assembly fails according to an embodiment of the disclosure.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and sizes of components may be exaggerated for convenience.

FIG. 1 is an exploded perspective view of a damping force variable valve assembly, a piston rod, and a piston valve according to an embodiment of the disclosure, FIG. 2 is a cross-sectional view in which the damping force variable valve assembly, the piston rod, and the piston valve, which are illustrated in FIG. 1 are assembled, FIG. 3 is a partially cut-away perspective view of the damping force variable valve assembly according to an embodiment of the disclosure, FIG. 4 is a cross-sectional view of the damping force variable valve assembly according to an embodiment of the disclosure, and FIG. 5 is an enlarged cross-sectional view of a pressure controller of the damping force variable valve assembly according to an embodiment of the disclosure.

Referring to FIGS. 1 to 5, a damping force variable valve assembly 1 according to an aspect of the disclosure may be installed in a cylinder (refer to reference numeral '10' of FIG. 4) of a shock absorber. The shock absorber may include a cylinder 10 filled with a fluid, a piston valve 30 provided to divide the inside of the cylinder 10 into a compression chamber 12 and a rebound chamber 13, and a piston rod 20 provided inside the cylinder 10 to enable a reciprocating motion (compression and rebound strokes) together with the piston valve 30. Accordingly, the piston valve 30 reciprocates in a direction of the compression stroke and a direction of the rebound stroke within the cylinder 10 together with the piston rod 20 to generate a damping force due to the resistance of the fluid.

The piston valve 30 is provided to divide the inside of the cylinder 10 into the compression chamber 12 and the rebound chamber 13. The piston valve 30 may include a valve body 31, a valve disk 34, and a valve mount 35.

The valve body 31 may be assembled at a lower end of a housing 100 of the damping force variable valve assembly 1, which will be described later. The valve mount 35 penetrates and is coupled to the center of the valve body 31, and one or more compression flow paths 32 and rebound flow paths 33 for connecting the compression chamber 12 and the rebound chamber 13 may be formed in a circumferential direction of the valve body 31.

The valve disk 34 is provided in a plate shape and installed on the valve body 31. The valve disk 34 may be provided to selectively open or close a compression flow path 32 and a rebound flow path 33 depending on the compression stroke or the rebound stroke of the piston rod 20. One or more of the valve disks 34 may be provided, and may be installed in a state in which a plurality of disks is stacked.

The valve mount 35 penetrates and is coupled to the valve body 31 and the valve disk 34. That is, the valve disk 34 is coupled to be in close contact with the valve body 31 by the valve mount 35. Accordingly, the valve mount 35 is fixed to the valve body 31 in a state in which the compression flow path 32 and the rebound flow path 33 are normally closed by supporting the valve disk 34.

The piston valve 30 as described above is coupled to the piston rod 20 together with the damping force variable valve assembly 1 of the disclosure to move together with the piston rod 20, and generates a damping force due to the resistance of the fluid during the compression stroke and the rebound stroke of the piston rod 20.

The shock absorber including the piston rod 20 and the piston valve 30 may be provided in a single-cylindrical structure consisting of a cylinder having a single cylindrical shape forming a space therein, and a double-cylindrical structure consisting of a cylinder having an inner tube and an outer tube. The damping force variable valve assembly 1 according to the disclosure may be applied and used regardless of the single-cylindrical or double-cylindrical structure. Therefore, the cylinder 10 described below should be understood to collectively refer to a cylinder of the single-cylindrical structure and an inner tube of the double-cylindrical structure.

According to one aspect of the disclosure, the damping force variable valve assembly 1 may be provided between the piston rod 20 and the piston valve 30 to control the damping force. Specifically, the damping force variable valve assembly 1 may include the housing 100, a solenoid 200, and a pressure controller 300.

The housing 100 has a predetermined accommodating space so that the solenoid 200 and the pressure controller 300, which will be described later, are installed therein, and is coupled to the piston rod 20 and the piston valve 30. As illustrated in the drawings, the housing 100 has an upper end to which the piston rod 20 is coupled and the lower end to which the piston valve 30 is coupled to move together with the piston valve 30 in the cylinder 10 according to the reciprocating motion of the piston rod 20. A plurality of oil passages 101 is provided on a side surface of the housing 100 so that the fluid may flow into the compression chamber 12 or the rebound chamber 13 along a circumferential direction through the piston valve 30 and the pressure controller 300.

The solenoid 200 is installed in the housing 100 and includes a spool 210 provided to be operated by receiving power. The solenoid 200, which is a device provided to move the spool 210 up and down by a magnetic force of a coil (not shown) provided on the outside of the solenoid 200, is a well-known technology, and thus a detailed description thereof will be omitted.

The spool 210 is coupled to a poppet valve 341, which will be described later, to adjust the damping force by moving the poppet valve 341 forward and backward. A structure for adjusting the damping force depending on an operation of the poppet valve 341 will be described again later.

The pressure controller 300 is disposed between the solenoid 200 and the piston valve 30 in the housing 100 to serve to adjust the damping force depending on an operation of the solenoid 200 and the compression stroke and rebound stroke. Specifically, the pressure controller 300 may include a valve housing 310, a valve seat 320, a poppet valve unit 340, a main valve unit 350, a plurality of flow paths 410, 420, 430, and 440, and a plurality of ball check valves 510, 520, 530, and 540.

A hollow portion 311 in which a plurality of steps is formed in a vertical direction that is a longitudinal direction may be formed at the center of the valve housing 310. In the hollow portion 311, the poppet valve unit 340, the valve seat 320, and the main valve unit 350 are sequentially assembled. Also, the hollow portion 311 may be divided into a poppet chamber 314 and a pilot chamber 315 by the valve seat 320, which will be described later. Specifically, the hollow portion 311 is provided with the poppet chamber 314 on an upper portion and the pilot chamber 315 on a lower portion with respect to the valve seat 320. A main flow path 312 connecting the compression chamber 12 and the rebound chamber 13 through the piston valve 30 is provided in the valve housing 310.

The main flow path 312 is provided to penetrate a side surface of the valve housing 310 to be connected to the hollow portion 311. That is, the main flow path 312 serves to guide the fluid in the compression chamber 12 and the rebound chamber 13 to flow therethrough by selectively communicating with the hollow portion 311 depending on the up-and-down movement of the main valve unit 350, which will be described later. Accordingly, it is appropriate for the main flow path 312 to be provided at a position corresponding to the oil passage 101 formed in the housing 100 on a lower side 311 of the main valve unit 350 forming the pilot chamber 315.

The plurality of flow paths 410, 420, 430, and 440 formed in the pressure controller 300 may be provided as the first flow path 410 connecting the piston valve 30 and the pilot chamber 315, the second flow path 420 connecting the poppet chamber 314 and the rebound chamber 13, the third flow path 430 connecting the rebound chamber 13 and the pilot chamber 315, and the fourth flow path 440 connecting the poppet chamber 314 and the piston valve 30. The first flow path 410 may be provided in the main valve unit 350, which will be described later, and the second to fourth flow paths 420, 430, and 440 may be provided in the valve housing 310.

The first ball check valve 510 may be provided in the first flow path 410, the second ball check valve 520 may be provided in the second flow path 420, the third ball check valve 530 may be provided in the third flow path 430, and the fourth ball check valve 540 may be provided in the fourth flow path 440.

The first and second ball check valves 510 and 520 may be provided to open and close the first and second flow paths 410 and 420 by being opened during the compression stroke of the piston rod 20 and closed during the rebound stroke of the piston rod 20, and the third and fourth ball check valves 530 and 540 may be provided to open and close the third and fourth flow paths 430 and 440 by being opened during the rebound stroke of the piston rod 20 and closed during the compression stroke of the piston rod 20. That is, the plurality of flow paths 410, 420, 430, and 440 and the plurality of ball check valves 510, 520, 530, and 540 are provided to allow the flow of the fluid separately from the main flow path 312 depending on the compression stroke or rebound stroke of the piston rod 20.

The first to fourth ball check valves 510, 520, 530, and 540 may be provided in a state in which a preload is zero during operation. Each of the ball check valves 510, 520, 530, and 540 has a structure of opening and closing each of the flow paths 410, 420, 430, and 440 through a ball and allowing a flow in one direction. In this case, the first to fourth ball check valves 510, 520, 530, and 540 has a structure of opening and closing each of the flow paths 410, 420, 430, and 440 through the ball and allowing a flow in one direction. Accordingly, as the balls of the first to fourth ball check valves 510, 520, 530, and 540 are provided such that a load is not applied through a separate member, the first to fourth ball check valves 510, 520, 530, and 540 may be provided in the state in which the preload is zero. Therefore, the balls of the first to fourth ball check valves 510, 520, 530 and 540 may open and close the flow paths 410, 420, 430 and 440 depending on a pressure generated in the shock absorber. That is, according to an aspect of the disclosure, the first to fourth ball check valves 510, 520, 530, and 540 may be provided in the state in which the preload is zero to be opened and closed quickly depending on the pressure change, thereby improving the responsiveness, and as a result, linearity of a damping force through pressure control may be improved.

The second ball check valve 520 and the fourth ball check valve 540 provided in the second flow path 420 and the fourth flow path 440 may be provided to be symmetrical to each other. In this case, the second flow path 420 and the fourth flow path 440 are provided to be connected to the poppet chamber 314 depending on the operation of the poppet valve 341, and the second ball check valve 520 and the fourth ball check valve 540 may perform operations opposite to each other by the pressure change depending on the compression stroke or the rebound stroke to control a required damping force even when they are provided at symmetrical positions.

The fourth flow path 440 may include a horizontal flow path 441 connected to the poppet chamber 314 by penetrating the side surface of the valve housing 310, and a vertical flow path 442 connected to the piston valve 30 by being connected to the horizontal flow path 441. Accordingly, the fourth flow path 440 may connect the poppet chamber 314 and the piston valve 30 without passing through the pilot chamber 315.

The ball of the first ball check valve 510 provided in the first flow path 410 is provided to move in a predetermined section in the first flow path 410, and has one side provided to open and close the first flow path 410 and the other side provided to be supported by a support plate 359, which will be described later, so that the ball may be prevented from being separated from the first flow path 410.

The ball of the second ball check valve 520 provided in the second flow path 420 is provided to move in a predetermined section in the second flow path 420, and has one side provided to open and close the second flow path 420 and the other side provided to be supported by a fastening member 330, so that the ball may be prevented from being separated from the second flow path 420.

The ball of the third ball check valve 530 provided in the third flow path 430 is provided to move in a predetermined section in the third flow path 430, and has one side provided to open and close the third flow path 430 and the other side provided to be supported by the main valve unit 350, so that the ball may be prevented from being separated from the third flow path 430.

The ball of the fourth ball check valve 540 provided in the fourth flow path 440 is provided to move in a predetermined section in the fourth flow path 440, that is, the horizontal flow path 441, and has one side provided to be supported by an end wall connected to the vertical flow path 442 and the other side provided to open and close the horizontal flow path 441, so that the ball may be prevented from being separated from the fourth flow path 440. In this case, it is obvious that the ball of the fourth ball check valve 440 is formed to have a larger diameter than that of the vertical flow path 442.

The first flow path 410 may be formed at the center of the main valve unit 350, the second and third flow paths 420 and 430 among the second to fourth flow paths 420, 430, and 440 may be formed on the right side with respect to a central axis of the valve housing 310 in a longitudinal direction, and the fourth flow path 440 may be formed on the left side. According to one aspect of the disclosure, the positions of the first to fourth flow paths 410, 420, 430, and 440 are limited, but as long as the ball check valves 510, 520, 530, and 540 are provided in the first to fourth flow paths 410, 420, 430, and 440, respectively, to control the flow of the fluid depending on the pressure change, the positions may be electively changed.

The fastening member 330 may be coupled to an upper portion of the valve housing 310 so that the pressure controller 300 is configured as a single assembly together with the solenoid 200. That is, the solenoid 200 may be closely coupled to an upper end of the fastening member 330, and the valve housing 310 may be closely coupled to a lower end of the fastening member 330, thereby forming a single assembly. Accordingly, the solenoid 200 and the pressure controller 300 coupled by the fastening member 330 are mounted in the housing 100 in one process, thereby ensuring ease of assembly.

In addition, the fastening member 330 is coupled to the upper portion of the valve housing 310 to surround a predetermined area. Accordingly, an auxiliary flow path 331 connecting the second and third flow paths 420 and 430 and the rebound chamber 13 may be provided in the fastening member 330 or the valve housing 310 to allow the flow of the fluid through the second and third flow paths 420 and 430 formed in the valve housing 310. A structure in which the fluid flows through the auxiliary flow path 331 and the flow of the fluid will be described again later.

A stepped portion 313a may be provided at an upper end of the valve housing 310 to provide an auxiliary chamber 313b communicating with the poppet chamber 314 depending on the operation of the poppet valve 341. The stepped portion 313a is provided to be spaced apart from the solenoid 200 facing the valve housing 310 by a predetermined distance. Referring to FIG. 5, the stepped portion 313a formed to be stepped from the hollow portion 311 at the upper end of the valve housing 310 is provided with the auxiliary chamber 313b on a side surface thereof. The auxiliary chamber 313b may be connected to each of the second and fourth flow paths 420 and 440 formed in the valve housing 310. When the poppet valve 341 is operated as the stepped portion 313a is spaced apart from the solenoid 200 by the predetermined distance, the fluid moves smoothly into the auxiliary chamber 313b through a gap between the stepped portion 313a and the solenoid 200. The structure in which the fluid flows into the auxiliary chamber 313b depending on the operation of the poppet valve 341 will be described again later.

The valve seat 320 is provided in the hollow portion 311 of the valve housing 310 to divide the hollow portion 311 into the poppet chamber 314 and the pilot chamber 315. A connection flow path 321 for communicating the poppet chamber 314 and the pilot chamber 315 is formed on the valve seat 320. One or more of the connection flow paths 321 may be formed to vertically penetrate the valve seat 320. Support protrusions 325 for supporting a main spring 355 of the main valve unit 350, which will be described later, may be formed at a lower end of the valve seat 320.

The poppet valve unit 340 is provided in the poppet chamber 314 to serve to adjust an amount of the fluid passing through the connection flow path 321 depending on the operation of the solenoid 200. Specifically, the poppet valve unit 340 may include the poppet valve 341 connected to the spool 210 and a poppet spring 345 installed in the poppet chamber 314 to elastically support the poppet valve 341.

The poppet valve 341 is operated by the spool 210 to be movable forward and backward within the poppet chamber 314. The poppet valve 341 includes a poppet body part 342 connected to the spool 210, and a flange part 343 formed to extend radially from the poppet body part 342.

The spool 210 is coupled to the center of the poppet body part 342, and the poppet body part 342 may be formed to protrude downward, that is, toward the valve seat 320. The poppet body part 342 may move depending on the operation of the spool 210 and may be selectively maintained spaced apart from the valve seat 320 and the solenoid 200 or may be in contact with the valve seat 320.

The flange part 343 may be provided integrally with the poppet body part 342. A communication hole 344 for connecting the poppet chamber 314 and the second and fourth flow paths 420 and 440 may be formed on the flange part 343. One or more of the communication holes 344 may be formed by vertically penetrating the flange part 343. The flange part 343 may be provided to be in close contact with an inner circumferential surface of the hollow portion 311. As illustrated in the drawing, the flange part 343 is provided to be in contact with the inner circumferential surface of the hollow portion 311 in which the stepped portion 313a is formed. Accordingly, a flow of the fluid between an outer surface of the flange part 343 and the inner circumferential surface of the hollow portion 311 is blocked. Therefore, the flow of the fluid is allowed only through the communication hole 344. That is, when the poppet valve 341 is separated from the solenoid 200, the fluid flows through the communication hole 344, and the communication hole 344 communicates with the auxiliary chamber 313b through the gap between the stepped portion 313a and the solenoid 200. In this case, the auxiliary chamber 313b communicates with the second flow path 420 and the fourth flow path 440.

The poppet spring 345 is provided in the poppet chamber 314 to elastically support the poppet valve 341. That is, the poppet spring 345 may have one end supported by the poppet valve 341 and the other end supported by the valve seat 320. Accordingly, the poppet spring 345 provides an elastic force to the poppet valve 341 in a direction of being spaced apart from the valve seat 320. When the power to the solenoid 20 is cut off, that is, when the solenoid 20 fails, the poppet spring 345 elastically presses the poppet valve 341 to be in close contact with the solenoid 200.

One or more stoppers 346 protruding to one side may be provided on the poppet valve 341. The stoppers 346 are formed to protrude from one surface of the poppet valve 341 facing the solenoid 200. The stopper 346 is provided in a ring shape on an upper side of the poppet valve 341, and may be provided with at least one slit (not shown) to communicate the poppet chamber 314 and the second flow path 420 and the fourth flow path 440. Accordingly, even in a state in which no current is applied to the solenoid 200, the poppet valve 341 and the solenoid 200 are maintained in a state of being spaced apart from each other by a thickness of the stopper 346. A structure of the flow of the fluid by the stopper 346 depending on the short circuit of the solenoid 200 as above will be described again later.

When a low current is applied to the solenoid 200, the poppet valve 341 may be operated to communicate the poppet chamber 314 and the second flow path 420 or the fourth flow path 440 through the communication hole 344 depending on the compression stroke or the rebound stroke and to maintain the poppet body part 342 and the valve seat 320 in a state of being spaced apart by a predetermined distance. When a high current is applied to the solenoid 200, the poppet valve 341 may be operated to maintain the poppet body part 342 in a state of being in contact with the valve seat 320.

The main valve unit 350 is installed in the pilot chamber 315 to be movable up and down and to serve to mutually move the fluid in the compression chamber 12 and the rebound chamber 13 depending on the compression stroke or the rebound stroke of the piston rod 20. Specifically, the main valve unit 350 may include a main seat 351, a main valve 353, the main spring 355, and a ring disk 357.

The main seat 351 may be coupled to be fixed to a lower end of the valve housing 310. The main seat 351 has a hollow center to communicate with the compression flow path 32 and the rebound flow path 33 of the piston valve 30. An upper rim 351a protruding upward in a circumferential direction is provided on an upper end of the main seat 351, that is, on a surface facing the main valve 353.

The main valve 353 is provided to be movable up and down in the pilot chamber 315. The main valve 353 may be provided to have a disk-shaped body and a cup-shaped protrusion extending upward from an edge of the body. That is, the main valve 353 may be provided to be in contact with the inner circumferential surface of the hollow portion 311 forming the pilot chamber 315 to be moved while being guided by the inner circumferential surface. The first flow path 410 formed to penetrating vertically such that the piston valve 30 and the pilot chamber 315 communicate with each other may be provided in the center of the main valve 353. The first ball check valve 510 is provided in the first flow path 410. A lower rim 353a protruding downward in a circumferential direction is provided on a lower end of the main seat 351, that is, on a surface facing the main valve 353.

The main spring 355 is provided in the pilot chamber 315 to serve to elastically support the main valve 353 toward the main seat 351. That is, one end (upper end) of the main spring 355 is supported on the lower end of the valve seat 320, and the other end is supported on an inner bottom surface of the main valve 353. Accordingly, the main valve 353 moves upward while compressing the main spring 355 by a pressure of the fluid during the compression stroke or the rebound stroke of the piston rod 20, thereby opening the main flow path 312, The main valve 353 is returned to its original position by an elastic restoring force of the main spring 355.

The main spring 355 has an elastic force greater than that of the poppet spring 345. In this case, as an upper end of the valve seat 320 is supported on the stepped portion of the hollow portion 311, the main spring 355 elastically supports the main valve 353 downward, the poppet spring 345 elastically supports the poppet valve 341 upward.

The ring disk 357 is interposed between the main seat 351 and the main valve 353. The ring disk 357 has a donut shape in which a flow path hole 357a is formed in the center thereof to allow the fluid to pass therethrough. As illustrated in the drawing, a lower end of the ring disk 357 is in contact with the upper rim 351a, and an upper end of the ring disk 357 is in contact with the lower rim 353a. The ring disk 357 is provided to move up and down together with the main valve 353 during the compression stroke and fixed in a state of being supported on the upper rim 351a during the rebound stroke. This is due to a pressure difference during the compression stroke and the rebound stroke.

It is appropriate that the ring disk 357 is provided to be disposed at a position corresponding to a position where the main flow path 312 is formed. A stepped groove 354 may be formed on a lower side of the main valve 353, that is, at a portion where the ring disk 357 is provided. This is to press the ring disk 357 from an upper side to a lower side when the main valve 353 moves through the main flow path 312 to be fixed in a state of being in contact with the upper rim 351a, and to allow only the main valve 353 to easily move up and down. That is, the fluid is allowed to be introduced into the stepped groove 354 to facilitate the upward movement of the main valve 353.

The support plate 359 for supporting the first ball check valve 510 to prevent the ball from being separated from the first flow path 410 during an opening operation of the first ball check valve 510 provided in the first flow path 410 is further provided. The support plate 359 is installed in the main valve 353, and a long hole 359a may be formed at a position facing the first ball check valve 510. The long hole 359a is provided such that the fluid flows from the first flow path 410 to the pilot chamber 315 when the first ball check valve 510 is opened. Accordingly, the long hole 359a is formed to have a smaller width and a longer length than the diameter of the ball to prevent the ball from being separated and to allow the fluid to move smoothly.

Hereinafter, an operation of the damping force variable valve assembly 1 according to an embodiment of the disclosure will be described with reference to FIGS. 6 to 9.

FIG. 6 is a view illustrating an operation during a compression stroke of a shock absorber provided with the damping force variable valve assembly according to an embodiment of the disclosure, FIG. 7 is a view illustrating an operation during a rebound stroke of the shock absorber provided with the damping force variable valve assembly according to an embodiment of the disclosure, FIG. 8 is a view illustrating that a pressure is controlled through the damping force variable valve assembly according to an embodiment of the disclosure, and FIG. 9 is a view illustrating an operation of the shock absorber when a solenoid of the damping force variable valve assembly fails according to an embodiment of the disclosure.

First, an operation in which the piston rod 20 generates a soft damping force when the compression stroke is performed will be described with reference to FIG. 6.

Referring to FIG. 6, the spool 210 of the solenoid 200 operates to press the poppet valve 341 downward. That is, the poppet valve 341 compresses the poppet spring 345 and is positioned to be spaced apart between the solenoid 200 and the valve seat 320. At this time, a low current (about 0.3 A to 0.5 A) is applied to the solenoid 200, so that the poppet valve 341 may be maintained in a state of moving forward toward the valve seat 320 by a predetermined distance, together with the spool 210.

In this state, during the compression stroke of the piston rod 20, the fluid in the compression chamber 12 moves to the rebound chamber 13 through the compression flow path 32 of the piston valve 30 and the main flow path 312. At this time, the main valve 353 and the ring disk 357 are pushed upward by the fluid so that the fluid smoothly moves to the rebound chamber 13 through the main flow path 312.

At the same time, the fluid in the compression chamber 12 opens the first ball check valve 510 provided in the first flow path 410 and moves to the pilot chamber 315 through the first flow path 410. At this time, the ball of the first ball check valve 510 may be supported by the support plate 359 when opening the first flow path 410, and the fluid may easily flow into the pilot chamber 315 through the long hole 359a of the support plate 359.

The fluid in the pilot chamber 315 moves to the second flow path 420 through the connection flow path 321 of the valve seat 320 and the poppet chamber 314. That is, because the poppet valve 341 is in a state of being spaced apart between the solenoid 200 and the valve seat 320, the fluid may pass through the communication hole 344 of the flange part 343, and the fluid passed through the communication hole 344 is introduced into the auxiliary chamber 313b connected to the second flow path 420 through the gap between the stepped portion 313a of the valve housing 310 and the solenoid 200.

Finally, the fluid opens the second ball check valve 520 provided in the second flow path 420, and moves to the rebound chamber 13 through the auxiliary flow path 331 formed between the second flow path 420 and the fastening member 330. Therefore, during the compression stroke, the fluid flowing from the compression chamber 12 to the rebound chamber 13 flows into the rebound chamber 13 also through the first and second flow paths 410 and 420 separately from the main flow path 312, so that a soft damping force may be generated by increasing a cross-sectional area of the flow paths through which the fluid flows.

On the other hand, the third flow path 430 is closed by the third ball check valve 530, and the fourth flow path 440 is closed by the fourth ball check valve 540. In this case, the fourth flow path 440 is in a state of being connected to the auxiliary chamber 313b, like the second flow path 420, but the vertical flow path 442 has a structure of being connected to the piston valve 30, so that the fourth flow path 440 is maintained in a state of being closed by the fourth ball check valve 540 due to a pressure difference.

Next, an operation in which the piston rod generates a soft damping force when the rebound stroke is performed will be described with reference to FIG. 7.

Referring to FIG. 7, the spool 210 of the solenoid 200 operates to position the poppet valve 341 to be spaced apart between the solenoid 200 and the valve seat 320 as in the compression stroke.

In this state, during the rebound stroke of the piston rod 20, the fluid in the rebound chamber 13 moves to the compression chamber 12 through the main flow path 312. At this time, only the main valve 341 is pushed upward by the fluid, and the ring disk 357 is fixed to the main seat 351.

At the same time, the fluid in the rebound chamber 13 opens the third ball check valve 530 provided in the third flow path 430 and moves to the pilot chamber 315. In this case, the fluid in the rebound chamber 13 may be moved to the third flow path 430 through the auxiliary flow path 331 formed between the third flow path 430 and the fastening member 330.

The fluid moved to the pilot chamber 315 moves to the fourth flow path 430 through the connection flow path 321 of the valve seat 320 and the poppet chamber 314. That is, because the poppet valve 341 is in the state of being spaced apart between the solenoid 200 and the valve seat 320, the fluid may pass through the communication hole 344 of the flange part 343, the fluid passed through the communication hole 344 is introduced into the auxiliary chamber 313b connected to the fourth flow path 430 through the gap between the stepped portion 313a of the valve housing 310 and the solenoid 200.

Finally, the fluid opens the fourth ball check valve 540 in the fourth flow path 440, passes through the horizontal flow path 441 and the vertical flow path 442, and moves to the compression chamber 12 through the rebound flow path 33 of the piston valve 30. Therefore, during the rebound stroke, the fluid flowing from the rebound chamber 13 to the compression chamber 12 flows into the compression chamber 12 also through the third and fourth flow paths 430 and 440 separately from the main flow path 312, so that a soft damping force may be generated by increasing a cross-sectional area of the flow paths through which the fluid flows.

On the other hand, the firth flow path 410 is closed by the firth ball check valve 510, and the second flow path 420 is closed by the second ball check valve 520. In this case, because the firth flow path 410 is in a state of being connected to the pilot chamber 315, the first flow path 410 is maintained in a state of being closed by the first ball check valve 510 due to a pressure difference by the fluid introduced into the pilot chamber 315 through the third flow path 430. In addition, the second flow path 420 is in a state of being connected to the auxiliary chamber 313b, like the fourth flow path 440, but has a structure of being connected to the auxiliary flow path 331, so that the second flow path 420 is maintained in a state of being closed by the second ball check valve 520 due to a pressure difference.

As described above, the damping force may be controlled depending on the opening and closing operations of the first to fourth check valves 510, 520, 530, and 540 during the compression stroke or the rebound stroke. Moreover, the first to fourth check valves 510, 520, 530, and 540 may be provided in a state in which the preload is zero to open and close the flow paths by responding quickly even to a minimum load, thereby improving the linearity of the damping force through pressure control.

Next, an operation of adjusting the damping force through pressure control will be described with reference to FIG. 8.

Referring to FIG. 8, the spool 210 of the solenoid 200 operates to press the poppet valve 341 downward. That is, the poppet valve 341 is positioned to compress the poppet spring 345 and come into contact with the valve seat 320. At this time, a high current (about 1.6 A to 1.8 A) is applied to the solenoid 200, so that the poppet valve 341 is moved forward toward the valve seat 320 together with the spool 210 to be maintained in a close contacting state.

In this state, the fluid moves the main valve 353 toward the valve seat 320 depending on the compression stroke and the rebound stroke of the piston rod 20, the fluid in the compression chamber 12 flows into the rebound chamber 13 through the main flow path 312, and the fluid in the rebound chamber 13 flows into the compression chamber 12 through the main flow path 312, thereby generating a damping force.

Because an electromagnetic force of the solenoid 200 operated such that the poppet valve 341 comes into contact with the valve seat 320 is controlled to be the same as the resultant force of the elastic force of the poppet spring 345 and the elastic force of the main spring 355, a pressure of the damping force variable valve assembly 1 may be maintained in a relatively high state. In addition, as the current applied to the solenoid 200 becomes higher, the poppet valve 341 moves forward toward the valve seat 320 and a force to be in close contact with the valve seat 320 becomes stronger, and the pressure inside the damping force variable valve assembly 1 becomes higher, That is, as the load required for the fluid to move the main valve 353 up increases, a relatively high damping force may be implemented.

Finally, an operation of the damping force variable valve assembly when the solenoid fails will be described with reference to FIG. 9.

Referring to FIG. 9, when the solenoid 200 fails, that is, when no current is applied to the solenoid 200, the poppet valve 341 is maintained in a state of being in close contact with the solenoid 200 by being elastically supported on the solenoid 200 side by the poppet spring 345. In this case, the poppet valve 341 is maintained in a state of being spaced apart from the solenoid 200 by the stopper 346. Accordingly, the poppet chamber 314, the second flow path 420 and the fourth flow path 440 are connected to each other through the slit (not shown) provided on the stopper 346. That is, during the compression stroke and the rebound stroke of the piston rod 20, most of the fluid flows through the main flow path 312, and as described with reference to FIGS. 6 and 7, the remaining part of the fluid opens the second ball check valve 520 in the second flow path 420 or the fourth ball check valve 440 in the fourth flow path 440 depending on the compression stroke and the rebound stroke and then moves to the rebound chamber 13 or the compression chamber 12.

As a result, the damping force variable valve assembly 1 according to an aspect of the disclosure enables an auxiliary movement of the fluid through the opening of the poppet valve 341 to increase the cross-sectional area of the flow paths, thereby generating a soft damping force. Further, a hard damping force and a soft damping force may be selectively implemented by adjusting an internal pressure of the damping force variable valve assembly 1 depending on the operation of the solenoid 200, thereby securing the linearity of the damping force for each current. Furthermore, when the solenoid 200 fails, the internal pressure of the damping force variable valve assembly 1 may be provided in a state higher than the soft damping force and lower than the hard damping force.

In particular, the plurality of ball check valves 510, 520, 530, and 540 provided in the damping force variable valve assembly 1 is provided in the state in which the preload is zero to respond quickly even to the minimum load, so that the ride comfort may be improved on a road surface where stroke changes frequently occur.

As is apparent from the above, a damping force variable valve assembly according to an embodiment of the disclosure has an effect of improving linearity of a damping force through pressure control by being provided as a poppet type built in a shock absorber and by improving the responsiveness so that a check valve may respond and open quickly by a minimum load.

In addition, the damping force variable valve assembly according to an embodiment of the disclosure has an effect of improving a structure thereof to reduce the cost and assembly process as well as improve a tuning freedom.

While the disclosure has been particularly described with reference to exemplary embodiments, it should be understood by those of skilled in the art that various changes in form and details may be made without departing from the spirit and scope of the disclosure.

What is claimed is:

1. A damping force variable valve assembly installed in a shock absorber including a cylinder filled with a fluid, and a piston valve provided to divide the inside of the cylinder into a compression chamber and a rebound chamber and perform a compression stroke and a rebound stroke together with a piston rod, the damping force variable valve assembly comprising:

a housing having an upper end to which the piston rod is coupled and a lower end to which the piston valve is coupled to move together with the piston valve in the cylinder;

a solenoid installed in the housing and having a spool operated by a magnetic force; and a pressure controller disposed between the solenoid and the piston valve within the housing, provided with a main flow path through which the fluid moves during the compression stroke or the rebound stroke, and provided to adjust a damping force depending on an operation of the solenoid, wherein the pressure controller includes first and second ball check valves provided to allow a flow of the fluid separately from the main flow path during the compression stroke, and third and fourth ball check valves provided to allow a flow of the fluid separately from the main flow path during the rebound stroke, and the first to fourth ball check valves are provided in a state in which a preload is zero when operated, and, wherein the pressure controller includes:

a valve housing having a hollow portion formed in a longitudinal direction and provided with the main flow path connecting the compression chamber and the rebound chamber through the piston valve;

a valve seat provided to divide the hollow portion into a poppet chamber and a pilot chamber and provided with a connection flow path communicating the poppet chamber and the pilot chamber;

a poppet valve unit provided in the poppet chamber to adjust an amount of the fluid passing through the connection flow path depending on the operation of the solenoid; and a main valve unit installed in the pilot chamber to be movable up and down so as to mutually move the fluid in the compression chamber and the rebound chamber, and, wherein a stepped portion is provided at an upper end of the valve housing to provide an auxiliary chamber that is closed or communicates with the poppet chamber depending on an operation of the poppet valve.

2. The damping force variable valve assembly according to claim 1, wherein the pressure controller is provided with:

a first flow path connecting the piston valve and the pilot chamber;

a second flow path connecting the poppet chamber and the rebound chamber;

a third flow path connecting the rebound chamber and the pilot chamber; and a fourth flow path connecting the poppet chamber and the piston valve.

3. The damping force variable valve assembly according to claim 2, wherein the first flow path is provided in the main valve unit, and the second to fourth flow paths are provided to penetrate a side surface of the valve housing to communicate with the hollow portion.

4. The damping force variable valve assembly according to claim 2, wherein a first ball check valve is provided in the first flow path, a second ball check valve is provided in the second flow path, a third ball check valve is provided in the third flow path, and a fourth ball check valve is provided in the fourth flow path, the first and second ball check valves are opened during the compression stroke and closed during the rebound stroke to open and close the first and second flow paths, and the third and fourth ball check valves are opened during the rebound stroke and closed during the compression stroke to open and close the third and fourth flow paths.

5. The damping force variable valve assembly according to claim 4, wherein
the second and fourth ball check valves are provided to be symmetrical to each other in the second and fourth flow paths.

6. The damping force variable valve assembly according to claim 2, wherein
the fourth flow path includes a horizontal flow path provided to penetrate a side surface of the valve housing so as to be connected to the poppet chamber, and a vertical flow path connected to the horizontal flow path so as to be connected to the piston valve.

7. The damping force variable valve assembly according to claim 2, further comprising
a fastening member coupled to the valve housing to be configured as one assembly together with the solenoid on an upper portion of the valve housing so as to mount the valve housing in the housing.

8. The damping force variable valve assembly according to claim 7, wherein
the second flow path and the third flow path are formed to be spaced apart from each other by a predetermined distance on the same side surface of the valve housing, and
an auxiliary flow path connecting the second and third flow paths and the rebound chamber is provided in the fastening member or the valve housing.

9. The damping force variable valve assembly according to claim 2, further comprising
a support plate installed in the main valve unit to support the first ball check valve provided in the first flow path, wherein a long hole is formed on the support plate to prevent a ball from being separated when the first ball check valve is opened and to allow the fluid to flow into the pilot chamber through the first flow path.

10. The damping force variable valve assembly according to claim 2, wherein
the poppet valve unit includes:
a poppet valve having a poppet body part connected to the spool to move forward and backward depending on an operation of the spool and selectively come into contact with the valve seat, and a flange part formed to extend in a radial direction from the poppet body part to be in close contact with an inner circumferential surface of the hollow portion of the valve housing; and
a poppet spring installed in the poppet chamber to elastically support the poppet valve upward.

11. The damping force variable valve assembly according to claim 10, wherein
the poppet valve includes at least one stopper protruding toward the solenoid.

12. The damping force variable valve assembly according to claim 10, wherein
at least one communication hole formed to vertically penetrate the flange part to communicate the poppet chamber with the second and fourth flow paths is provided on the flange part.

13. The damping force variable valve assembly according to claim 12, wherein
when a low current is applied to the solenoid, the poppet valve is operated to communicate the communication hole with the second flow path or the third flow path depending on the compression stroke or the rebound stroke and to maintain the poppet body part and the valve seat in a state of being spaced apart by a predetermined distance.

14. The damping force variable valve assembly according to claim 10, wherein when a high current is applied to the solenoid, the poppet valve is operated to maintain
the poppet body part in a state of being in contact with the valve seat.

15. The damping force variable valve assembly according to claim 2, wherein
when the poppet valve unit closes the poppet chamber and the second and fourth flow paths, the first to fourth ball check valves are maintained in a closed state so that the fluid moves only through the main flow path.

16. The damping force variable valve assembly according to claim 1, wherein
the main valve unit includes:
a main seat fixed to the valve housing and having a hollow center;
a main valve installed in the pilot chamber to be movable up and down and provided with a first flow path formed vertically to communicate the piston valve and the pilot chamber;
a main spring installed in the pilot chamber to elastically support the main valve toward the main seat; and
a ring disk interposed between the main valve and the main seat and having a flow path hole formed in the center thereof to allow the fluid to pass therethrough.

17. The damping force variable valve assembly according to claim 16, wherein
the main valve is provided to move up and down together with the ring disk during the compression stroke, and only the main valve is provided to move up and down during the rebound stroke.

18. The damping force variable valve assembly according to claim 16, wherein
the ring disk is disposed at a position corresponding to a position where the main flow path is formed.

* * * * *